(12) United States Patent
Kim et al.

(10) Patent No.: US 10,647,322 B2
(45) Date of Patent: May 12, 2020

(54) BACKWARD DRIVING ASSIST APPARATUS FOR VEHICLE AND CONTROL METHOD THEREOF

(71) Applicant: HYUNDAI MOBIS CO., LTD., Seoul (KR)

(72) Inventors: Je Seok Kim, Suwon-si (KR); Jeong Ku Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 124 days.

(21) Appl. No.: 16/044,508

(22) Filed: Jul. 25, 2018

(65) Prior Publication Data

US 2019/0031194 A1 Jan. 31, 2019

(30) Foreign Application Priority Data

Jul. 25, 2017 (KR) .......................... 10-2017-0093931
Jul. 28, 2017 (KR) .......................... 10-2017-0095858

(51) Int. Cl.
*B60W 30/18* (2012.01)
*G05D 1/02* (2020.01)
*B60W 30/06* (2006.01)
*B62D 15/02* (2006.01)
(Continued)

(52) U.S. Cl.
CPC ...... *B60W 30/18036* (2013.01); *B60W 30/06* (2013.01); *B62D 15/027* (2013.01); *B62D 15/0285* (2013.01); *G05D 1/0221* (2013.01); *G05D 1/0272* (2013.01); *B60R 2300/304* (2013.01); *B60R 2300/802* (2013.01);
(Continued)

(58) Field of Classification Search
CPC ....... B60W 30/18036; B60W 2530/14; B60W 30/10; B60W 30/06; B60W 40/114; B60W 10/20; B62D 15/027; B62D 15/0285; G05D 1/0221; G05D 1/0272; G05D 2201/0213; B60R 2300/802; B60R 2300/304
See application file for complete search history.

(56) References Cited

U.S. PATENT DOCUMENTS

2015/0291158 A1* 10/2015 Okita .................. B60W 30/09
701/1
2016/0082886 A1 3/2016 Jeong

FOREIGN PATENT DOCUMENTS

KR 10-2014-0083783 7/2014
KR 10-1491423 2/2015
KR 10-2015-0077823 7/2015

* cited by examiner

Primary Examiner — Yuen Wong
(74) Attorney, Agent, or Firm — H.C. Park & Associates, PLC

(57) ABSTRACT

A backward driving assist apparatus for a vehicle may include: a vehicle speed sensor configured to measure a vehicle speed by counting a wheel pulse of a wheel; a steering angle sensor configured to measure a steering angle of a steering wheel; a yaw rate sensor configured to measure a yaw rate of the vehicle during driving; a driving trace storage configured to store driving trace data generated during forward driving; and a controller configured to estimate the position of the ego vehicle, interpolate the driving trace data generated at each preset distance, store the driving trace data in the driving trace storage, read the driving trace data from the driving trace storage during backward driving, generate a target steering angle by compensating for a direction angle error from the ego vehicle position, and output the target steering angle to an MDPS controller.

18 Claims, 5 Drawing Sheets

(51) Int. Cl.
 *B60W 40/114* (2012.01)
 *B60W 10/20* (2006.01)
(52) U.S. Cl.
 CPC ........... *B60W 10/20* (2013.01); *B60W 40/114* (2013.01); *G05D 2201/0213* (2013.01)

BACKWARD DRIVING ASSIST APPARATUS FOR VEHICLE AND CONTROL METHOD THEREOF

CROSS-REFERENCES TO RELATED APPLICATIONS

This application claims priority from and the benefit of Korean Patent Application No. 10-2017-0093931, filed on Jul. 25, 2017, and Korean Patent Application No. 10-2017-0095858, filed on Jul. 28, 2017, which is hereby incorporated by reference for all purposes as if set forth herein.

BACKGROUND

Field

Exemplary embodiments relate to a backward driving assist apparatus for a vehicle and a control method thereof, and more particularly, to a backward driving assist apparatus for a vehicle, which can improve estimation precision by estimating an ego vehicle position through dead reckoning when the vehicle drives backward along a driving trace stored during forward driving, interpolate driving trace data generated at each preset distance during forward driving with a parameter, and improve convergence speed by using a steering angle command inputted during forward driving as a feed-forward element, and a control method thereof.

Discussion of the Background

There are a lot of drivers having difficulties in backing up a vehicle, because the vehicle has a different movement trace from forward driving during backward driving. This is because, although a driver uses a room mirror and side mirrors during backward driving, the driver must frequently check the rear view and obstacles in person with the naked eye because a dead zone is present, and back up the vehicle by stepping on the accelerator pedal and decelerator pedal while handling the steering wheel.

In particular, while a vehicle moves in a narrow alley or a parking lot with a narrow parking space, the vehicle may encounter an oncoming vehicle so as not to move forward any more. In this case, the vehicle must move backward along the route that the vehicle has moved. However, an inexperienced driver may feel considerable difficulties in backing up the vehicle in such a narrow space, and neither move the vehicle forward nor backward.

Furthermore, when a vehicle comes in contact with a parked vehicle or wall while turning in a narrow space where many vehicles are packed, the vehicle must be backed up along the same route that the vehicle has turned, in order to prevent additional vehicle damage. However, an inexperienced driver may give bigger damage to the vehicle, not knowing what to do.

Examples of an apparatus for assisting a driver to back up a vehicle may include a parking assist system (PAS), a parking guide system (PGS) and a rearview monitor.

The rearview monitor has a limitation in securing visibility to monitor left and right sides in the above-described situation, and the PAS and the PGS generate a continuous warning sound which may make a driver nervous.

Furthermore, when the steering wheel is slightly distorted to the left or right while the vehicle moves backward in a narrow road, the vehicle may lean to the left or right. In this case, the PAS and the PGS have a limitation in solving such a situation.

The blind spot detection (BSD) system refers to a system that detects whether another vehicle is present at the rear and sides thereof within a predetermined distance (for example, 7 m) during lane change, using a radar sensor, and generates a warning sound when a vehicle is present. The BSD system is not suitable for being used as an apparatus for assisting backward driving in an alley or narrow road, and has difficulties in sensing an obstacle without a rear and side sensor such as a radar sensor.

The related art is disclosed in Korean Patent Publication No. 2015-0077823 published on Jul. 8, 2015 and entitled "Automatic backing route control system for vehicle".

The automatic backing route control system according to the related art sequentially stores trace data at each predetermined distance, the trace data being generated during forward driving. During backward driving, the automatic backing route control system acquires trace data in the opposite order of the data stored during the forward driving, and controls the backward route of the vehicle.

However, the vehicle has different radiuses of turn during forward driving and backward driving. Therefore, when the backward route is controlled in the same manner as the forward route only through a vehicle sensor and steering angle sensor, the error rate may be increased.

The above information disclosed in this Background section is only for enhancement of understanding of the background of the invention and, therefore, it may contain information that does not constitute prior art.

SUMMARY

Exemplary embodiments of the present invention provide a backward driving assist apparatus for a vehicle, which can improve estimation precision by estimating an ego vehicle position through dead reckoning when the vehicle drives backward along a driving trace stored during forward driving, interpolate driving trace data generated at each preset distance during forward driving with a parameter, and improve convergence speed by using a steering angle command inputted during forward driving as a feed-forward element, and a control method thereof.

Additional features of the invention will be set forth in the description which follows, and in part will be apparent from the description, or may be learned by practice of the invention.

An exemplary embodiment of the present invention discloses a backward driving assist apparatus for a vehicle may including: a vehicle speed sensor configured to measure a vehicle speed by counting a wheel pulse of a wheel; a steering angle sensor configured to measure a steering angle of a steering wheel; a yaw rate sensor configured to measure a yaw rate of the vehicle during driving; a driving trace storage configured to store driving trace data generated during forward driving; and a controller configured to estimate the position of the ego vehicle by matching the wheel pulse count of the vehicle speed sensor, the steering angle of the steering angle sensor and the yaw rate of the yaw rate sensor during forward driving, interpolate the driving trace data generated at each preset distance with a curve function or linear function depending on a lateral change, store the driving trace data in the driving trace storage, read the driving trace data from the driving trace storage during backward driving, generate a target steering angle by compensating for a direction angle error between the driving trace data and the ego vehicle position, and output the target steering angle to an Motor Driven Power Steering (MDPS) controller.

The driving trace storage may include a ring buffer.

The controller may compare the lateral change of the driving trace data to a preset value, interpolate the driving trace data with a cubic curve function when the lateral change is equal to or more than the preset value, and store the driving trace data with a parameter of the curve function in the driving trace storage, or interpolate the driving trace data with a linear function when the lateral change is less than the preset value, and store the driving trace data with a parameter of the linear function in the driving trace storage.

The controller may estimate an absolute change at a reference position at each preset time interval based on the wheel pulse count, estimate a lateral change from the steering angle and the yaw rate, and estimate the ego vehicle position by accumulating the absolute change and the lateral change.

The controller may generate the target steering angle by forward feeding the steering angle inputted during forward driving, while performing PID control based on the driving trace data and the ego vehicle position.

The controller may include: a vehicle position estimator configured to estimate the ego vehicle position by matching the wheel pulse count of the vehicle speed sensor, the steering angle of the steering angle sensor and the yaw rate of the yaw rate sensor; a forward trace manager configured to store position data of the ego vehicle position in the driving trace storage, the ego vehicle position being estimated at each preset distance by the vehicle position estimator during forward driving, calculate the lateral change for the driving trace data when the driving trace data are generated in such a manner that the number of position data is equal to or more than a preset value, determine whether the driving trace data correspond to a curved road or straight road, interpolate the driving trace data with the curve function or the linear function, and store the driving trace data with the parameter of the curve function or the linear function in the driving trace storage; an error calculator configured to read the driving trace data from the driving trace storage and calculate a direction angle error between the driving trace data and the ego vehicle position, during backward driving; and a route tracker configured to generate the target steering angle from the driving trace data by compensating for the direction angle error calculated through the error calculation unit.

The forward trace manager may update the position data by replacing the oldest position data with the latest position data, when the driving trace storage is full.

Another exemplary embodiment of the present invention discloses a control method of a backward driving support method for a vehicle may including: determining, by a controller, whether a vehicle drives forward, and estimating the position of the ego vehicle at each preset distance when the vehicle drives forward; storing, by the controller, position data of the estimated ego vehicle position in a driving trace storage; calculating, by the controller, a lateral change of driving trace data when the driving trace data are generated in such a manner that the number of position data stored in the driving trace storage is equal to or more than a preset value; determining, by the controller, whether the driving trace data correspond to a curved road, based on the lateral change; interpolating, by the controller, the driving trace data with a curve function when it is determined that the driving trace data correspond to a curved road, or interpolating the driving trace data with a linear function when it is determined that the driving trace data correspond to a straight road; and storing, by the controller, the driving trace data with a parameter of the curve function or the linear function in the driving trace storage.

The control method may further include: determining, by the controller, whether the vehicle drives forward, and reading the driving trace data from the driving trace storage when it is determined that the vehicle drives backward; estimating, by the controller, the ego vehicle position; calculating, by the controller, a direction angle error between the driving trace data and the ego vehicle position; and generating, by the controller, a target steering angle by compensating for the direction angle error calculated from the driving trace data, and outputting the generated target steering angle to an MDPS controller.

The controller may generate the target steering angle by forward feeding a steering angle inputted during forward driving, while performing PID control based on the driving trace data and the ego vehicle position.

The estimating of the vehicle position may include: estimating, by the controller, an absolute change at a reference position at each preset time interval, based on a wheel pulse count of a vehicle speed sensor; estimating, by the controller, a lateral change from a steering angle of a steering angle sensor and a yaw rate of a yaw rate sensor; and estimating, by the controller, the ego vehicle position by accumulating the absolute change and the lateral change.

In another embodiment, a backward driving assist apparatus for a vehicle may include: a vehicle speed sensor configured to measure a vehicle speed by counting a wheel pulse of a wheel; a steering angle sensor configured to measure a steering angle of a steering wheel; a yaw rate sensor configured to measure a yaw rate of the vehicle during driving; a driving trace storage configured to store driving trace data generated during forward driving; and a controller configured to estimate the position of the ego vehicle by matching the wheel pulse count of the vehicle speed sensor, the steering angle of the steering angle sensor and the yaw rate of the yaw rate sensor during forward driving, interpolate the driving trace data generated at each preset distance with a curve function, store the driving trace data in the driving trace storage, read the driving trace data from the driving trace storage during backward driving, generate a target steering angle by compensating for a direction angle error between the driving trace data and the ego vehicle position, and output the target steering angle to an MDPS controller.

The driving trace storage may include a ring buffer.

The controller may interpolate the driving trace data with a cubic curve function, and store a parameter of the curve function in the driving trace storage.

The controller may estimate an absolute change at a reference position at each preset time interval based on the wheel pulse count, estimate a lateral change from the steering angle and the yaw rate, and estimate the ego vehicle position by accumulating the absolute change and the lateral change.

The controller may generate the target steering angle by forward feeding the steering angle inputted during forward driving, while performing PID control based on the driving trace data and the ego vehicle position.

The controller may include: a vehicle position estimator configured to estimate the ego vehicle position by matching the wheel pulse count of the vehicle speed sensor, the steering angle of the steering angle sensor and the yaw rate of the yaw rate sensor; a forward trace manager configured to store position data of the ego vehicle position in the driving trace storage, the ego vehicle position being estimated at each preset distance by the vehicle position estimator during forward driving, interpolate the driving trace data with a curve function when the driving trace data are generated in such a manner that the number of position data is equal to or more than a preset value, and store the driving trace data with a parameter of the curve function in the driving trace storage; an error calculator configured to read the driving trace data from the driving trace storage and calculate a direction angle error between the driving trace data and the ego vehicle position, during backward driving; and a route tracker configured to generate the target steering angle from the driving trace data by compensating for the direction angle error calculated from the error calculation unit.

The forward trace manager may update the position data by replacing the oldest position data with the latest position data, when the driving trace storage is full.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
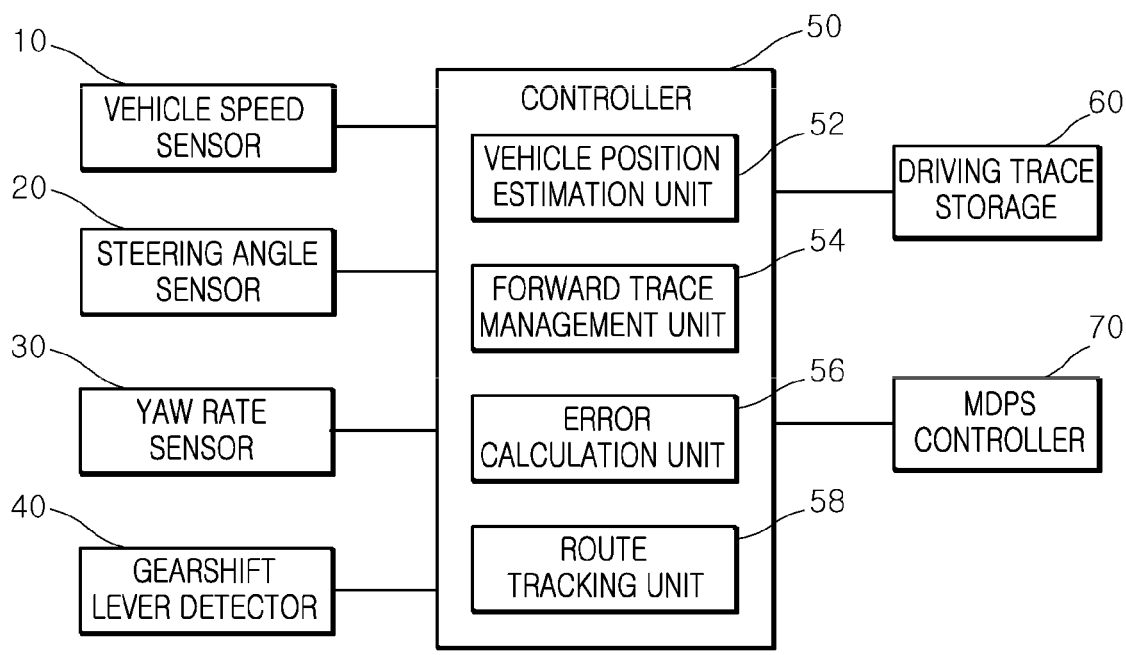
FIG. 1 is a block diagram illustrating a backward driving assist apparatus for a vehicle in accordance with an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereafter, a backward driving assist apparatus for a vehicle and a control method thereof in accordance with embodiments of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
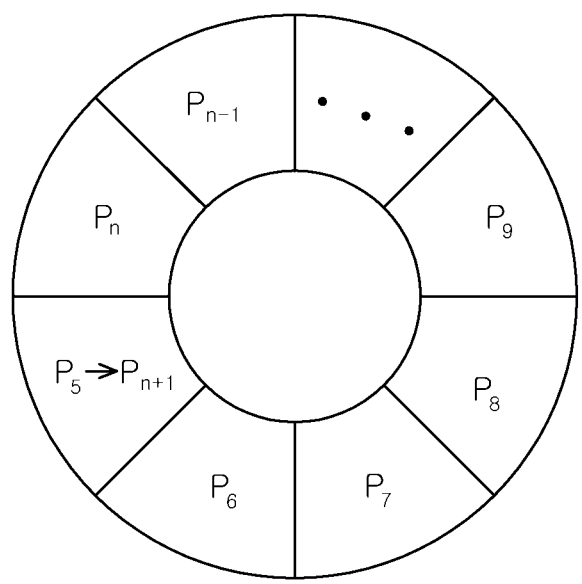
FIG. 2 illustrates a ring buffer structure of a driving trace storage in the backward driving assist apparatus for a vehicle in accordance with the exemplary embodiment.

FIG. 1 is a block diagram illustrating a backward driving assist apparatus for a vehicle in accordance with an embodiment of the present invention, and FIG. 2 illustrates a ring buffer structure of a driving trace storage in the backward driving assist apparatus for a vehicle in accordance with the embodiment of the present invention.

As illustrated in FIGS. 1 and 2, the backward driving assist apparatus for a vehicle in accordance with the embodiment of the present invention may include a vehicle speed sensor 10, a steering angle sensor 20, a yaw rate sensor 30, a driving trace storage 60 and a controller 50.

The vehicle speed sensor 10 may count a wheel pulse of a wheel, and provide the wheel pulse count to the controller 50 to determine a vehicle speed and moving distance.

The steering angle sensor 20 may measure a steering angle at which a steering wheel of the vehicle is rotated, and provide the measured steering angle to the controller 50.

The yaw rate sensor 30 may measure a yaw rate of the vehicle during driving, and provide the measured yaw rate to the controller 50 to estimate a lateral change of the vehicle.

The driving trace storage 60 may store driving trace data generated during forward driving.

The driving trace storage 60 may include a ring buffer to sequentially store data as illustrated in FIG. 2. When the ring buffer is full, the ring buffer may sequentially store data from the starting position again, such that the oldest data are updated into the latest data.

The controller 50 may determine the position of a gearshift lever through a gearshift lever detector 40. When the gearshift lever is in position D, the controller 50 may estimate the position of the ego vehicle by matching the wheel pulse count of the vehicle speed sensor 10, the steering angle of the steering angle sensor 20 and the yaw rate of the yaw rate sensor 30, while the vehicle drives forward. Furthermore, the controller 50 may interpolate driving trace data generated at each preset distance using a curve function, and store the driving trace data with a parameter of the curve function in the driving trace storage 60.

When the gearshift lever detector 40 determines that the gearshift lever is in position R, the controller 50 may read the driving trace data from the driving trace storage 60, calculate a target steering angle by compensating for a direction angle error from the position of the ego vehicle, and output the target steering angle to an MDPS controller 70.

The controller 50 may include a vehicle position estimation unit or vehicle position estimator 52, a forward trace management unit or forward trace manager 54, an error calculation unit or error calculator 56 and a route tracking unit or route tracker 58.

The vehicle position estimator 52 may estimate the position of the ego vehicle through dead reckoning by matching the wheel pulse count of the vehicle speed sensor 10, the steering angle of the steering angle sensor 20 and the yaw rate of the yaw rate sensor 30.

At this time, since the dead reckoning method estimates the position by integrating changes of measurement values, more errors may be accumulated with the increase of the moving distance. In order to solve such a problem, an absolute change at a reference position may be estimated at a preset time interval based on the wheel pulse count, a lateral change may be estimated from the steering angle and the yaw rate, and the absolute change and the lateral change may be accumulated to estimate the position of the ego vehicle, which makes it possible to reduce the influence of the accumulated errors.

The forward trace manager 54 may store position data of the ego vehicle position in the driving trace storage 60 at each preset distance while the ego vehicle drives forward, the ego vehicle position being estimated by the vehicle position estimator 52. When the driving trace data are generated in such a manner that the number of position data is equal to or more than a preset value, the forward trace manager 54 may interpolate the driving trace data with a cubic curve function, and store the driving trace data with a parameter of the cubit curve function in the driving trace storage 60.

By interpolating such discrete driving trace data with the cubic curve function, the movement of the vehicle can be successively expressed, and the actual trace of the vehicle can be expressed through the minimum data.

Since the driving trace storage 60 has the ring buffer structure as illustrated in FIG. 2, the forward trace manager 54 may sequentially store the position data by updating the oldest position data P5 into the latest position data Pn+1 in the case where the ring buffer is full.

The error calculator 56 may read the driving trace data from the driving trace storage 60 and calculate a direction angle error from the ego vehicle position, during backward driving.

The route tracker 58 may generate a target steering angle from the driving trace data by compensating for the direction angle error calculated by the error calculator 56, and output the generated target steering angle to the MDPS controller 70.

The route tracker 58 may generate the target steering angle by forward feeding the steering angle inputted during forward driving, while performing PID control based on the driving trace data and the ego vehicle position. Thus, the direction angle error depending on the driving trace data and the ego vehicle position during backward driving can rapidly converge to zero.

Therefore, the MDPS controller 70 may operate a driving motor (not illustrated) according to the target steering angle, and rotate the steering wheel (not illustrated) to assist backward driving.

As described above, the backward driving assist apparatus for a vehicle in accordance with the embodiment of the present invention can estimate the ego vehicle position through the dead reckoning when the vehicle drives backward along the driving trace stored during forward driving, thereby improving the estimation precision. Furthermore, the backward driving assist apparatus can interpolate the driving trace data with the parameter of the curve function, the driving trace data being generated at each preset distance during forward driving, and store the driving trace data as continuous motions. Furthermore, during backward driving, the backward driving assist apparatus can improve convergence speed by using a steering angle command inputted during forward driving as a feed-forward element, thereby increasing a driver's convenience while enabling the driver to easily back up the vehicle.

In another embodiment, the controller 50 may determine the position of the gearshift lever through the gearshift lever detector 40. when the gearshift lever is in position D, the controller 50 may estimate the position of the ego vehicle by matching the wheel pulse count of the vehicle speed sensor 10, the steering angle of the steering angle sensor 20 and the yaw rate of the yaw rate sensor 30, distinguish between a curved road and a straight road by calculating a lateral change of the driving trace data generated at each preset distance, interpolate the driving trace data with a curve function or linear function depending on the curved road or the straight road, and store the driving trace data with a parameter of the curve function or the linear function in the driving trace storage 60.

As such, the controller 50 can distinguish the driving trace data depending on the curved road and the straight road, and interpolate the driving trace data with the curve function in case of the curved road, or interpolate the driving trace data with the linear function in case of the straight road, thereby reducing computing amount. Furthermore, the controller 50 can minimize an error which occurs when the driving trace data are interpolated regardless of the road shape, and store the driving trace data as continuous motions.

At this time, the forward trace manager 54 may store the position data of the ego vehicle position in the driving trace storage 60, the ego vehicle position being estimated by the vehicle position estimator 52 at each preset distance while the vehicle drives forward. When the driving trace data are generated in such a manner that the number of position data is equal to or more than the preset value, the forward trace manager 54 may calculate a lateral change of the driving trace data from the steering angle and the yaw rate, and distinguish between a curved road and a straight road. In the case of a curved road, the forward trace manager 54 may interpolate the driving trace data with the cubic curve function, and store the driving trace data with the parameter of the cubic curve function in the driving trace storage 60. In the case of a straight road, the forward trace manager 54 may interpolate the driving trace data with the linear function, and store the driving trace data with the parameter of the linear function in the driving trace storage 60.

As such, the controller 50 can distinguish the driving trace data depending on a curved road and a straight road, and interpolate the driving trace data with the curved function or the linear function, thereby reducing computing amount. Furthermore, the controller 50 can minimize an error which occurs when the driving trace data are collectively interpolated regardless of the road shape, and store the driving trace data as continuous motions, using the minimum amount of data.

The operations of the vehicle position estimator 52, the error calculator 56 and the route tracker 58 may be performed in the same manner as the operations of the controller 50 of the backward driving assist apparatus for a vehicle in accordance with the embodiment of the present invention.

As described above, the backward driving assist apparatus for a vehicle in accordance with the embodiment of the present invention can estimate the position of the ego vehicle through the dead reckoning when the vehicle is driven backward along the driving trace stored during forward driving, thereby improving the estimation precision. Furthermore, the backward driving assist apparatus can distinguish the driving trace data depending on a curved road and a straight road, the driving trace data being generated at each preset distance during forward driving, and interpolate the driving trace data with the curve function or the linear function, thereby reducing the computing amount. Furthermore, the backward driving assist apparatus can minimize an error which occurs during the interpolation, and store the driving trace data as continuous motions. Furthermore, during backward driving, the backward driving assist apparatus can improve the convergence speed by using the steering angle command inputted during forward driving as a feed-forward element, thereby increasing a driver's convenience while enabling the driver to easily drive the vehicle backward.

Figure 3:
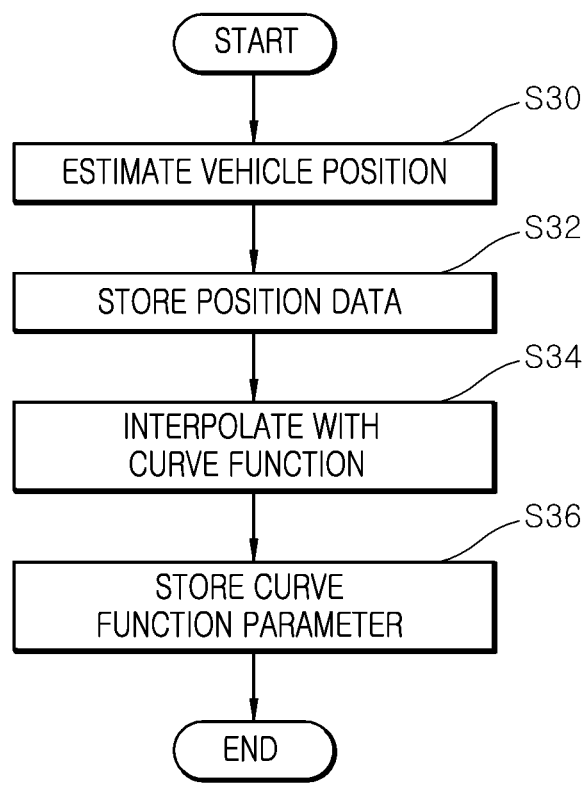
FIG. 3 is a flowchart illustrating a forward driving situation in a control method of a backward driving assist apparatus for a vehicle in accordance with an exemplary embodiment of the present invention.

FIG. 3 is a flowchart illustrating a forward driving situation in a control method of a backward driving assist apparatus for a vehicle in accordance with an embodiment of the present invention.

As illustrated in FIG. 3, the control method of the backward driving assist apparatus for a vehicle in accordance with the embodiment of the present invention may start with step S30 in which the controller 50 receives the position of the gearshift lever through the gearshift lever detector 40, and estimates the position of the ego vehicle at each preset distance when the gearshift lever is in position D.

At this time, the controller 50 may estimate an absolute change at the reference position at each preset time interval based on the wheel pulse count of the vehicle speed sensor 10, estimate a lateral change from the steering angle of the steering angle sensor 20 and the yaw rate of the yaw rate sensor 30, and estimate the ego vehicle position by accumulating the absolute changes and the lateral changes.

In the present embodiment, the controller 50 can estimate the absolute change at the reference position at each preset time interval, based on the wheel pulse count, thereby reducing the influence of accumulated errors in the dead reckoning method in which more errors are accumulated with the increase of the moving distance.

After estimating the ego vehicle position at step S30, the controller 50 may sequentially store the position data of the estimated ego vehicle position in the driving trace storage 60 at step S32.

For example, when the driving trace storage 60 has the ring buffer structure as illustrated in FIG. 2, the forward trace manager 54 may sequentially store the position data by updating the oldest position data P5 into the latest position data Pn+1 in the case where the ring buffer is full.

After sequentially storing the position data in the driving trace storage 60 at step S32, the controller 50 may interpolate the discrete driving trace data with the cubic curve function in the case where the driving trace data are generated in such a manner that the number of position data stored in the driving trace storage 60 is equal to or more than the preset value, and express the motions of the vehicle as continuous motions, at step S34.

As such, the controller 50 may not successively store the position data, but discretely store the position data, and then interpolate the position data with the cubic curve function. Therefore, the controller 50 can express the actual driving trace of the vehicle using the minimum amount of data, while expressing the motions of the vehicle as continuous motions.

After interpolating the driving trace data with the cubic curve function at step S34, the controller 50 may store the driving trace data with the parameter of the curve function in the driving trace storage 60 at step S36.

While the vehicle drives forward, the controller 50 may continuously generate the driving trace data and store the generated driving trace data in the driving trace storage 60.

Figure 4:
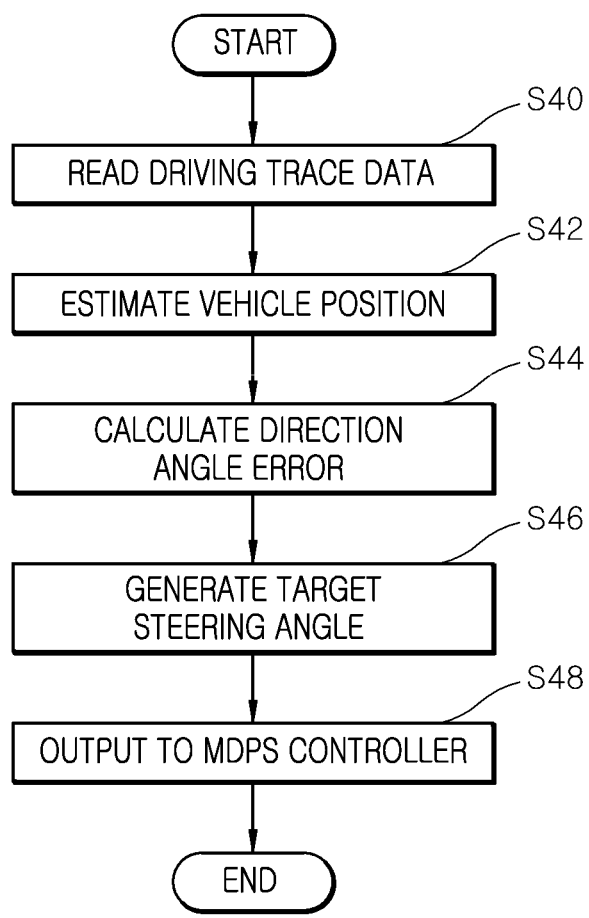
FIG. 4 is a flowchart illustrating a backward driving situation in the control method of the backward driving assist apparatus for a vehicle in accordance with the exemplary embodiment.

FIG. 4 is a flowchart illustrating a backward driving situation in the control method of the backward driving assist apparatus for a vehicle in accordance with the embodiment of the present invention.

As illustrated in FIG. 4, the control method of the backward driving assist apparatus for a vehicle in accordance with the embodiment of the present invention may start with step S40 in which the controller 50 receives the position of the gearshift lever through the gearshift lever detector 40, stops storing the driving trace data when the gearshift lever is in position R, and reads the driving trace data from the driving trace storage 60.

After reading the driving trace data at step S40, the controller 50 may receive a wheel pulse count, a steering angle and a yaw rate from the vehicle speed sensor 10, the steering angle sensor 20 and the yaw rate sensor 30, and estimate the position of the ego vehicle, at step S42.

At this time, the controller 50 can estimate an absolute change at the reference position at each preset time interval based on the wheel pulse count of the vehicle speed sensor 10, estimate a lateral change from the steering angle of the steering angle sensor 20 and the yaw rate of the yaw rate sensor 30, and estimate the ego vehicle position by accumulating the absolute changes and the lateral changes.

After estimating the ego vehicle position at step S42, the controller 50 may calculate a direction angle error between the driving trace data and the ego vehicle position at step S44.

After calculating the direction angle error at step S44, the controller 50 may generate a target steering angle by compensating for the direction angle error while performing PID control based on the driving trace data and the ego vehicle position, at step S46. At this time, the controller 50 may generate the target steering angle by forward feeding a steering angle inputted during forward driving, such that the direction angle error rapidly converges to 0.

The controller 50 may output the target steering angle generated at step S46 to the MDPS controller 70, such that the MDPS controller 70 can operate the driving motor (not illustrated) according to the target steering angle and rotate the steering wheel to assist backward driving, at step S48.

As described above, the control method of the backward driving assist apparatus for a vehicle in accordance with the embodiment of the present invention can estimate the position of the ego vehicle through the dead reckoning when the vehicle is driven backward along the driving trace stored during forward driving, thereby improving the estimation precision. Furthermore, the control method can interpolate the driving trace data with the parameter of the curve function, the driving trace data being generated at each preset distance during forward driving, and store the driving trace data as continuous motions. Then, during backward driving, the control method can improve the convergence speed by using the steering angle command inputted during forward driving as a feed-forward element, thereby increasing a driver's convenience while enabling the driver to easily drive the vehicle backward.

Figure 5:
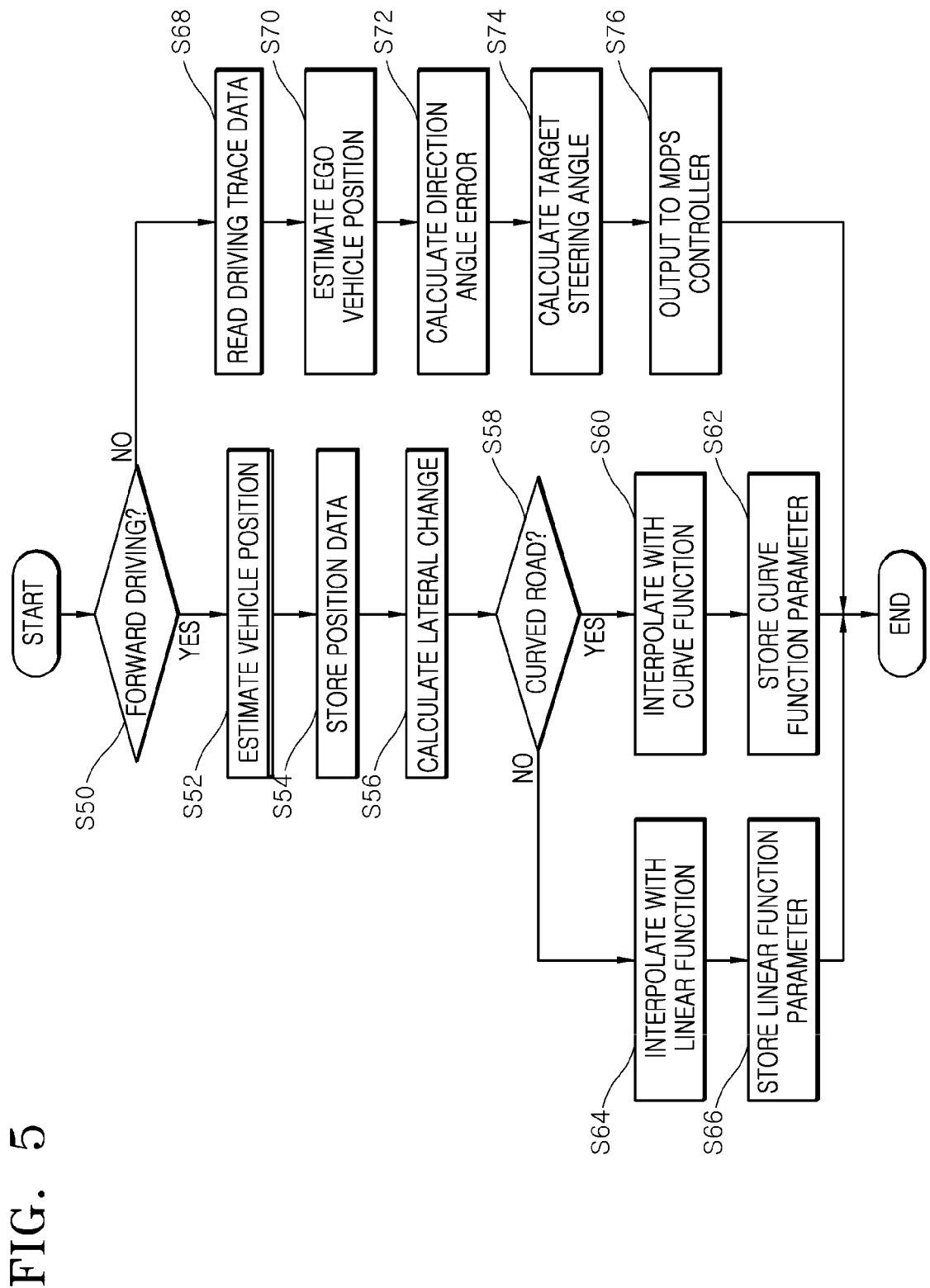
FIG. 5 is a flowchart illustrating a control method of a backward driving assist apparatus for a vehicle in accordance with another exemplary embodiment of the present invention.

FIG. 5 is a flowchart illustrating a control method of a backward driving assist apparatus for a vehicle in accordance with another embodiment of the present invention.

As illustrated in FIG. 5, the control method of the backward driving assist apparatus for a vehicle in accordance with the embodiment of the present invention may start with step S50 in which the controller 50 receives the position of the gearshift lever through the gearshift lever detector 40, and determines whether the vehicle drives forward or backward.

When it is determined at step S50 that the vehicle drives forward, the controller 50 may estimate the position of the ego vehicle at each preset distance at step S52.

At this time, the controller 50 may estimate an absolute change at the reference position at each preset time interval based on a wheel pulse count of the vehicle speed sensor 10, estimate a lateral change from a steering angle of the steering angle sensor 20 and a yaw rate of the yaw rate sensor 30, and estimate the ego vehicle position by accumulating the absolute changes and the lateral changes.

In the present embodiment, the controller 50 can estimate the absolute change at the reference position at each preset time interval based on the wheel pulse count, thereby reducing the influence of accumulated errors in the dead reckoning method in which more errors are accumulated with the increase of the moving distance.

After estimating the ego vehicle position at step S52, the controller 50 may sequentially store the position data of the estimated ego vehicle position in the driving trace storage 60 at step S54.

For example, when the driving trace storage 60 has the ring buffer structure as illustrated in FIG. 2, the controller 50 may sequentially store the position data by updating the oldest position data P5 into the latest position data Pn+1 in the case where the ring buffer is full.

After sequentially storing the position data in the driving trace storage 60 at step S54, the controller 50 may calculate a lateral change of the discrete driving trace data from the steering angle and the yaw rate in the case where the driving trace data are generated in such a manner that the number of position data stored in the driving trace storage 60 is equal to or more than the preset value, at step S56.

After calculating the lateral change at step S56, the controller 50 may determine whether the driving trace data correspond to a curved road, at step S58.

At this time, the controller 50 may compare the lateral change to a preset value, and determine that the driving trace data correspond to a curved road when the lateral change is equal to or more than the preset value, or determine that the driving trace data correspond to a straight road when the lateral change is less than the preset value.

When it is determined at step S58 that the driving trace data correspond to a curved road, the controller 50 may interpolate the driving trace data with the cubic curve function, thereby expressing the motions of the vehicle as continuous motions, at step S60.

As such, the controller 50 may not successively store the position data, but discretely store the position data, and then interpolate the position data with the cubic curve function, thereby expressing the motions of the vehicle as continuous motions.

After interpolating the driving trace data with the cubic curve function at step S60, the controller 50 may store the driving trace data with the parameter of the curve function in the driving trace storage 60, at step S62.

On the other hand, when it is determined at step S58 that the driving trace data correspond to a straight road, the controller 50 may interpolate the driving trace data with the linear function at step S64.

When the driving trace data correspond to a straight road, the controller 50 may interpolate the driving trace data with the linear function, thereby reducing the computing amount.

After interpolating the driving trace data with the linear function at step S64, the controller 50 may store the driving trace data with the parameter of the linear function in the driving trace storage 60, at step S66.

As such, the controller 50 can distinguish the driving trace data depending on a curved road and a straight road, and interpolate the driving trace data with the curve function or the linear function, thereby reducing the computing amount. Furthermore, the controller 50 can minimize an error which occurs when the driving trace data are collectively interpolated regardless of the road shape, and store the driving trace data as continuous motions, using the minimum amount of data.

When it is determined at step S50 that the vehicle drives backward, the controller 50 may stop storing the driving trace data, and read the driving trace data from the driving trace storage 60, at step S68.

After reading the driving trace data at step S68, the controller 50 may receive a wheel pulse count, a steering angle and a yaw rate from the vehicle speed sensor 10, the steering angle sensor 20 and the yaw rate sensor 30, and estimate the position of the ego vehicle, at step S70.

At this time, the controller 50 may estimate an absolute change at the reference position at each preset time interval based on the wheel pulse count of the vehicle speed sensor 10, estimate a lateral change from the steering angle of the steering angle sensor 20 and the yaw rate of the yaw rate sensor 30, and estimate the ego vehicle position by accumulating the absolute changes and the lateral changes.

After estimating the ego vehicle position at step S70, the controller 50 may calculate a direction angle error between the driving trace data and the ego vehicle position at step S72.

After calculating the direction angle error at step S72, the controller 50 may generate a target steering angle by compensating for the direction angle error while performing PID control based on the driving trace data and the ego vehicle position, at step S74. At this time, the controller 50 may generate the target steering angle by forward feeding a steering angle inputted during forward driving, such that the direction angle error rapidly converges to 0.

The controller 50 may output the target steering angle generated at step S74 to the MDPS controller 70, such that the MDPS controller 70 can operate the driving motor (not illustrated) according to the target steering angle and rotate the steering wheel to assist backward driving, at step S76.

As described above, the control method of the backward driving assist apparatus for a vehicle in accordance with the embodiment of the present invention can estimate the position of the ego vehicle through the dead reckoning when the vehicle is driven backward along the driving trace stored during forward driving, thereby improving the estimation precision. Furthermore, the control method can distinguish the driving trace data depending on a curved road and a straight road, the driving trace data being generated at each preset distance during forward driving, and interpolate the driving trace data with the curve function or the linear function, thereby reducing the computing amount. Furthermore, the control method can minimize an error which occurs during the interpolation, and store the driving trace data as continuous motions. Furthermore, during backward driving, the control method can improve the convergence speed by using the steering angle command inputted during forward driving as a feed-forward element, thereby increasing a driver's convenience while enabling the driver to easily drive the vehicle backward.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. A backward driving assist apparatus for a vehicle, comprising:
   a vehicle speed sensor configured to measure a vehicle speed by counting a wheel pulse count of a wheel;
   a steering angle sensor configured to measure a steering angle of a steering wheel;
   a yaw rate sensor configured to measure a yaw rate of the vehicle during driving;
   a driving trace storage configured to store driving trace data generated during forward driving; and
   a controller configured to estimate a vehicle position by matching the wheel pulse count, the steering angle and the yaw rate, interpolate the driving trace data generated at each preset distance with a curve function or a linear function depending on a lateral change, read the driving trace data during backward driving, generate a target steering angle by compensating for a direction angle error between the driving trace data and the vehicle position, and output the target steering angle to a Motor Driven Power Steering (MDPS) controller.

2. The backward driving assist apparatus of claim 1, wherein the driving trace storage comprises a ring buffer.

3. The backward driving assist apparatus of claim 1, wherein the controller is configured to compare the lateral change of the driving trace data to a preset value, interpolates the driving trace data with the curve function when the lateral change is equal to or more than the preset value, and store the driving trace data with a parameter of the curve function in the driving trace storage, or interpolate the driving trace data with the linear function when the lateral change is less than the preset value, and store the driving trace data with a parameter of the linear function in the driving trace storage.

4. The backward driving assist apparatus of claim 3, wherein the controller is configured to:
   estimate the vehicle position by matching the wheel pulse count, the steering angle and the yaw rate;
   store a position data of the vehicle position in the driving trace storage, the vehicle position being estimated at each preset distance by the vehicle position estimator during forward driving, calculate the lateral change of the driving trace data when the driving trace data are generated in such a manner that the position data is equal to or more than a preset value, determine whether the driving trace data correspond to a curved road or a straight road, interpolate the driving trace data with the curve function or the linear function, and store the driving trace data with a parameter of the curve function or the linear function in the driving trace storage;
   read the driving trace data from the driving trace storage and calculate a direction angle error between the driving trace data and the vehicle position, during backward driving; and
   generate the target steering angle from the driving trace data by compensating for the direction angle error.

5. The backward driving assist apparatus of claim 4, wherein the controller updates the position data by replacing an oldest position data with a latest position data, when the driving trace storage is full.

6. The backward driving assist apparatus of claim 1, wherein the controller is configured to estimate an absolute change at a reference position at each preset time interval based on the wheel pulse count, estimate a lateral change from the steering angle and the yaw rate, and estimate the vehicle position by accumulating the absolute change and the lateral change.

7. The backward driving assist apparatus of claim 1, wherein the controller is configured to generate the target steering angle by forward feeding the steering angle, while performing proportional-integral-derivative (PID) control based on the driving trace data and the vehicle position.

8. A control method of a backward driving support method for a vehicle, comprising:
   determining, by a controller, whether a vehicle is driving forward, and estimating a vehicle position at each preset distance when the vehicle is driving forward;

storing, by the controller, position data of the estimated vehicle position in a driving trace storage;

calculating, by the controller, a lateral change of driving trace data when the driving trace data are generated in such a manner that the position data stored in the driving trace storage is equal to or more than a preset value;

determining, by the controller, whether the driving trace data correspond to a curved road, based on the lateral change;

interpolating, by the controller, the driving trace data with a curve function when the driving trace data correspond to a curved road, or interpolating the driving trace data with a linear function when the driving trace data correspond to a straight road; and storing, by the controller, the driving trace data with a parameter of the curve function or the linear function in the driving trace storage.

9. The control method of claim 8, further comprising:
determining, by the controller, whether the vehicle is driving forward, and reading the driving trace data from the driving trace storage when it is determined that the vehicle is driving backward;
estimating, by the controller, the vehicle position;
calculating, by the controller, a direction angle error between the driving trace data and the vehicle position; and
generating, by the controller, a target steering angle by compensating for the direction angle error, and outputting the generated target steering angle to a Motor Driven Power Steering (MDPS) controller.

10. The control method of claim 9, wherein the controller is configured to generate the target steering angle by forward feeding a steering angle inputted during forward driving, while performing proportional-integral-derivative (PID) control based on the driving trace data and the vehicle position.

11. The control method of claim 9, wherein the step of estimating of the vehicle position comprises:
estimating, by the controller, an absolute change at a reference position at each preset time interval, based on a wheel pulse count counted by a vehicle speed sensor;
estimating, by the controller, a lateral change from a steering angle measured by a steering angle sensor and a yaw rate measured by a yaw rate sensor; and
estimating, by the controller, the vehicle position by accumulating the absolute change and the lateral change.

12. A backward driving assist apparatus for a vehicle, comprising:
a vehicle speed sensor configured to measure a vehicle speed by counting a wheel pulse count of a wheel;
a steering angle sensor configured to measure a steering angle of a steering wheel;
a yaw rate sensor configured to measure a yaw rate of the vehicle during driving;
a driving trace storage configured to store driving trace data generated during forward driving; and
a controller configured to estimate a vehicle position by matching the wheel pulse count, the steering angle and the yaw rate, interpolate the driving trace data generated at each preset distance with a curve function, store the driving trace data in the driving trace storage, read the driving trace data from the driving trace storage during backward driving, generate a target steering angle by compensating for a direction angle error between the driving trace data and the vehicle position, and output the target steering angle to a Motor Driven Power Steering (MDPS) controller.

13. The backward driving assist apparatus of claim 12, wherein the driving trace storage comprises a ring buffer.

14. The backward driving assist apparatus of claim 12, wherein the controller is configured to interpolate the driving trace data with a curve function, and store a parameter of the curve function in the driving trace storage.

15. The backward driving assist apparatus of claim 12, wherein the controller is configured to estimate an absolute change at a reference position at each preset time interval based on the wheel pulse count, estimate a lateral change from the steering angle and the yaw rate, and estimate the vehicle position by accumulating the absolute change and the lateral change.

16. The backward driving assist apparatus of claim 12, wherein the controller is configured to generate the target steering angle by forward feeding the steering angle inputted during forward driving, while performing proportional-integral-derivative (PID) control based on the driving trace data and the vehicle position.

17. The backward driving assist apparatus of claim 12, wherein the controller is configured to:
estimate the vehicle position by matching the wheel pulse count, the steering angle and the yaw rate;
store position data of the vehicle position in the driving trace storage, the vehicle position being estimated at each preset distance by the vehicle position estimator during forward driving, interpolate the driving trace data with a curve function when the driving trace data are generated in such a manner that the position data is equal to or more than a preset value, and store the driving trace data with a parameter of the curve function in the driving trace storage;
read the driving trace data from the driving trace storage and calculate a direction angle error between the driving trace data and the vehicle position, during backward driving; and
generate the target steering angle from the driving trace data by compensating for the direction angle error.

18. The backward driving assist apparatus of claim 17, wherein the controller is configured to update the position data by replacing an oldest position data with a latest position data, when the driving trace storage is full.

* * * * *